Aug. 29, 1933.

C. C. UNRUH

Re. 18,928

DOLLY FOR WASHING MACHINES

Original Filed Jan. 22, 1923

INVENTOR.
C. C. UNRUH.
BY HIS ATTORNEYS.
Williamson Reifel Williamson

Reissued Aug. 29, 1933

Re. 18,928

UNITED STATES PATENT OFFICE 18,928

DOLLY FOR WASHING MACHINES

Cornelius C. Unruh, Freeman, S. Dak., assignor, by mesne assignments, to The Meadows Manufacturing Company, a Corporation of Maryland Original No. 1,459,483, dated June 19, 1923, Serial No. 614,132, January 22, 1923. Application for reissue June 18, 1925. Serial No. 38,109

8 Claims. (Cl. 259—101)

This invention relates to a washing machine and particularly to that type of machine in which the articles to be washed are contained in a receptacle having a moving member or dolly therein for agitating the articles and water. The invention is especially directed to a novel form of such moving member or dolly. In the type of machine disclosed, it has heretofore been the practice to use a dolly which was oscillated or gyrated on a central spindle, which dolly comprised a dish-shaped member having a central upstanding hub portion therein, thus forming an annular trough which was traversed by vertical blades. Such a type of dolly was and is being used in the well known Maytag washing machine which is now upon the market. It has been found by experience that with such a dolly the clothes tend to accumulate in a knot or tangle above the dolly and by means of the present invention this objectionable action has been overcome.

It is an object of this invention, therefore, to provide a washing machine dolly or agitating member of the movable type which will efficiently agitate the water and clothes and yet will not cause any objectionable action thereof.

It is a further object of the invention to provide such a dolly comprising a central upstanding stem having radial ribs projecting therefrom and extending along the sides thereof.

It is more specifically an object of the invention to provide such a stem preferably of cylindrical form, the surface of which merges into the surface of the dish-shaped dolly and the ribs on which are integral and continuous with the ribs extending across the dish-shaped portion of the dolly.

These and other objects and advantages of the invention will more fully appear from the following description made in connection with the accompanying drawing in which like reference characters refer to the same parts throughout the different views, and in which, Fig. 1 is a view partly in elevation and partly in central vertical section of one type of washing machine showing the invention applied thereto;

Figure 1:
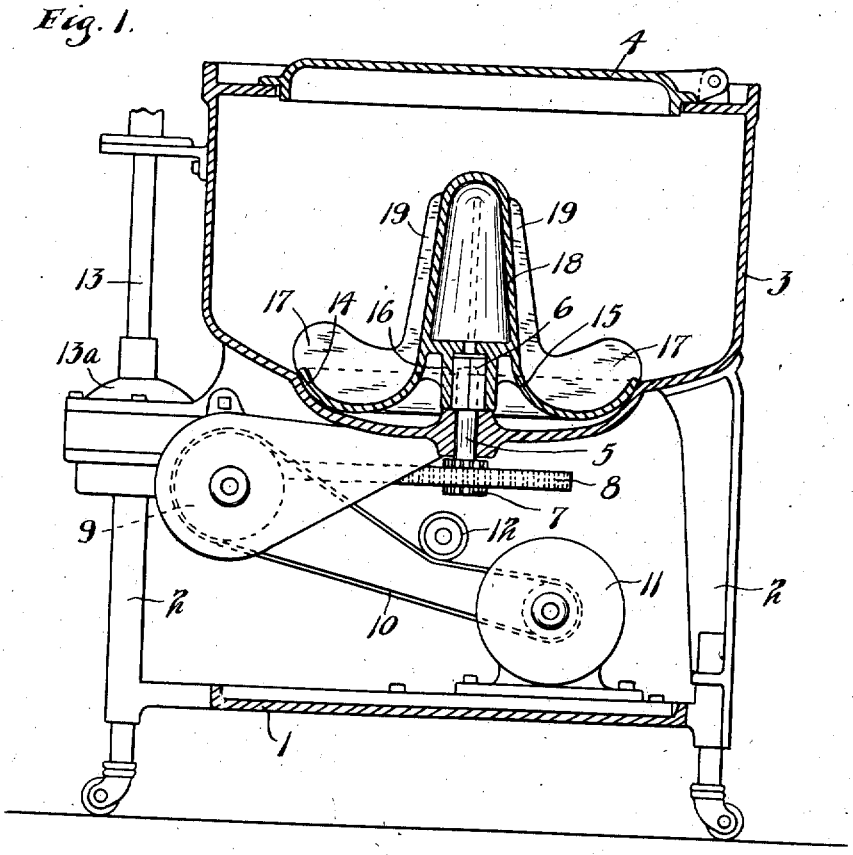
Figure 2:
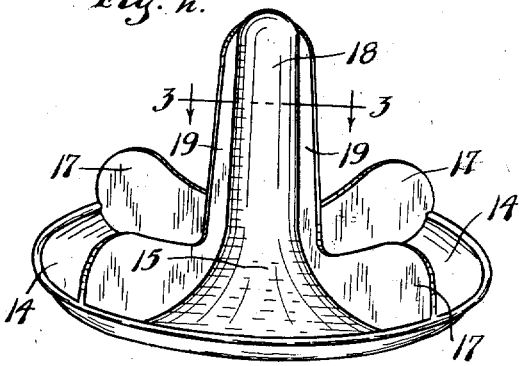
Fig. 2 is a perspective view of the dolly detached from the machine.

Referring to the drawing, in Fig. 1 a washing machine is shown comprising a frame having a base plate 1 with legs 2 projecting upwardly therefrom, being provided with casters at their lower ends. A receptacle 3 adapted to contain water and the articles to be washed is mounted upon the legs 2 and, as shown, is provided with a hinge cover 4 at the top thereof. The lower portion of the receptacle 3 is provided with a dish-shaped recess having a central hub in which is journaled a driving shaft 5 having an angularly-shaped portion 6 extending upwardly into the receptacle and having a pinion 7 secured to its lower end. The pinion 7 is arranged to mesh with a rack member 8 which is reciprocated by being attached at one end to a crank disk driven from a pulley 9 indicated in dotted lines in Fig. 1, which pulley is, in turn, driven by a belt 10 from a suitable motor 11 secured to the base 1. A tightening pulley 12 for said belt is also illustrated. A driving shaft 13 extends upwardly from certain gearing enclosed in a casing 13a for the purpose of driving a wringer which will be attached to the machine. The driving mechanism forms no part of the present invention and is merely illustrated to show how the dolly member is driven.

A washing machine having an average sized container requires substantially from ten to twelve gallons of liquid for efficient washing. The normal liquid level varies within small limits but may be said to extend about two thirds of the distance from the bottom to the top of the container.

Figure 3:
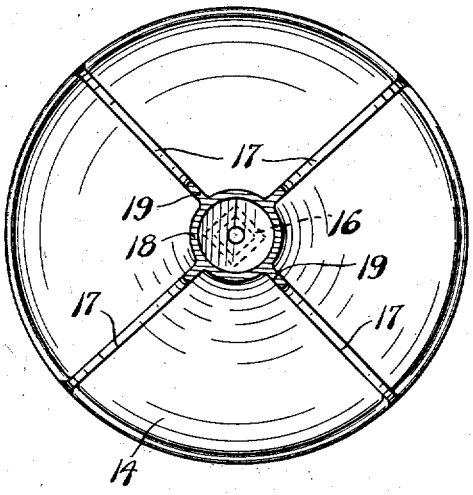
Fig. 3 is a horizontal section of the dolly taken substantially on the line 3—3 of Fig. 2.

The dolly member, as illustrated, comprises a cup-shaped or dish-shaped member 14 of a size and form to be disposed substantially in the recess in the bottom of the receptacle 3. The member 14 has an upstanding central portion 15 at the center thereof, the vertical elements of which are concave so that the surface thereof merges into the surface of the member 14 and forms, in effect, an annular trough. The underside of the portion 15 is provided with a sleeve or hub 16 having an angular recess therein so that said sleeve is adapted to fit over the angular portion 6 of the shaft 5, and be supported on the central hub at the bottom of the receptacle 3. A plurality of radial ribs 17 of lobe shape formation extend across the surface of the members 14 and 15 having their wider and curved ends disposed outwardly and rising above the outer edge of the member 14. A stem 18 is shown projecting upwardly from the portion 15 and centrally thereof, which stem is illustrated as circular in cross section although the same may be made of any other shape in cross section, if desired. The surface of the stem member is continuous with the surface of the member 15 and, as illustrated, said stem is substantially cylindrical having a slight upward taper. Said stem is provided with radially projecting rib or wing members 19 of small thickness, which ribs extend along the sides of said stem and increase in radial thickness slightly toward the lower end thereof, said lower ends merging into the inner ends of the ribs 17 so that the two form, in effect, one continuous rib. As clearly shown in Figs. 1 and 3, the stem portion 18 is preferably formed hollow and the dolly may be made of any suitable material, preferably metal. This stem during operation of the machine extends at least substantially up to the normal liquid level which is approximately six inches above the upper edges of the radial ribs or wings 17.

In the operation of the machine, the motor 11 is operated and power transmitted through the described gearing to reciprocate the rack 8. This rack being held in engagement with the pinion 7 the dolly member is given an oscillating movement, thus agitating the water and articles in the receptacle 3. By providing the upwardly projecting stem 18 with its ribs 19, the clothes are kept distributed in the trough formed about the dolly and do not become tangled in a central wad or knot as in the dollies heretofore used which were not provided with said stem. It will be readily understood that the stem extending upward from the lower portion of the dolly maintains the clothes at each side thereof separated.

It is seen, therefore, that the applicant has provided a simple and efficient form of dolly and one constituting a great improvement on those previously used. The change in the dolly does not add appreciably to the cost thereof or the difficulty of making and the improved dolly can readily be substituted for the old form.

The invention has been demonstrated in actual practice and found to be very successful and efficient for the purpose intended.

It will, of course, be understood that various changes may be made in the form, details and proportions of the parts without departing from the scope of applicant's invention, which, generally stated, consists in the matter shown and described and set forth in the appended claims.

What is claimed is:

1. A dolly for a washing machine adapted to be disposed in a liquid containing receptacle with its top portion well below the top of said receptacle comprising a dish-shaped member and a substantially cylindrical stem rising from and merging into the central portion thereof and terminating in an upper rounded end, said stem having spaced ribs extending vertically along its sides upwardly tapered throughout the length of said stem and extending outwardly across the dish-shaped member.

2. A dolly for a washing machine adapted to be disposed in a liquid containing receptacle with its top portion well below the top of said receptacle comprising a dish-shaped member and a substantially cylindrical stem rising from and merging into the central portion thereof and terminating in an upper rounded end, and spaced ribs extending from the top of said stem vertically downward and outwardly and upwardly across said dish-shaped member and having substantially semi-circular outer edges.

3. A dolly for a washing machine comprising a cup-shaped disk with a frusto-conical portion rising from its center having a substantially cylindrical stem projecting centrally thereabove and terminating in a rounded top, said stem having radial ribs projecting therefrom and extending along the sides thereof, said ribs being tapered throughout the length of said stem and extending in lobe-shaped form across the surface of said disk.

4. The structure set forth in claim 2, the lower portion of said semi-circular edges being substantially continuous with the surface of said dish-shaped member.

5. A dolly for a washing machine comprising a dish-shaped member and a rounded stem rising from and merging into the central portion thereof and terminating in an upper rounded end, spaced ribs extending vertically along said stem and merging into the upper rounded end thereof and extending across the dish-shaped member at the lower ends in lobe-shaped form whereby the upper surfaces thereof above said member are concave.

6. A dolly for a washing machine comprising an annular trough, a plurality of spaced radial wings extending across the surface of said trough, a stem rising centrally from said trough and extending materially above the upper edges of said radially extending wings and at least substantially up to the normal water level, said stem being of such size and shape as to prevent the tangling of clothes during operation.

7. A dolly for a washing machine comprising an annular trough, a plurality of spaced radial wings extending across the surface of said trough, a stem rising centrally from said trough and extending to a height substantially equal to the outer diameter of said annular trough and at least substantially up to the normal water level, said stem being of such size and shape as to prevent the tangling of clothes during operation.

8. In a washing machine, a container for clothes and liquid, said container having a downwardly and inwardly tapered bottom, a dolly disposed in said bottom, said dolly having an annular trough shaped portion, a plurality of spaced radial wings extending across the surface of the annular trough in said trough portion, a stem rising centrally from said trough shaped portion and extending materially above the upper edges of said radially extending wings and at least substantially up to the normal water level, the outer edges of said trough and the tapering surfaces of said container having a cooperating relationship for guiding the liquid action, said stem being of such size and shape to prevent the tangling of clothes during operation.

CORNELIUS C. UNRUH.